United States Patent
Braunisch et al.

(10) Patent No.: US 12,487,420 B2
(45) Date of Patent: Dec. 2, 2025

(54) APPARATUS AND METHOD OF MANUFACTURING A VERTICALLY DISAGGREGATED PHOTONIC DEVICE

(71) Applicant: Intel Corporation, Santa Clara, CA (US)

(72) Inventors: Henning Braunisch, Phoenix, AZ (US); Adel Elsherbini, Tempe, AZ (US)

(73) Assignee: Intel Corporation, Santa Clara, CA (US)

( * ) Notice: Subject to any disclaimer, the term of this patent is extended or adjusted under 35 U.S.C. 154(b) by 975 days.

(21) Appl. No.: 17/359,447

(22) Filed: Jun. 25, 2021

(65) Prior Publication Data

US 2022/0413237 A1    Dec. 29, 2022

(51) Int. Cl.
G02B 6/42    (2006.01)

(52) U.S. Cl.
CPC ......... *G02B 6/4274* (2013.01); *G02B 6/4236* (2013.01)

(58) Field of Classification Search
CPC ............................ G02B 6/4236; G02B 6/4274
See application file for complete search history.

(56) References Cited

U.S. PATENT DOCUMENTS

| | | | |
|---|---|---|---|
| 2012/0320939 A1 | 12/2012 | Baets et al. | |
| 2013/0182998 A1* | 7/2013 | Andry | G02B 6/4204 385/33 |
| 2014/0248723 A1* | 9/2014 | Shastri | G02B 6/4244 438/25 |
| 2014/0264400 A1* | 9/2014 | Lipson | G02B 6/12007 257/432 |
| 2020/0091124 A1* | 3/2020 | Liao | G02B 6/4201 |

FOREIGN PATENT DOCUMENTS

WO    2007143627 A2    12/2007

OTHER PUBLICATIONS

Fang et al., "Electrically pumped hybrid AlGaInAs-silicon evanescent laser," Optics Express, vol. 14, No. 20, pp. 9203-9210, Sep. 13, 2006, 8 pages.

Block et al., "Electro-optic polymer cladding ring resonator modulators," Optics Express, vol. 16, No. 22, pp. 18326-18333, Oct. 23, 2008, 8 pages.

Lhostis et al., "Reliable 300 mm wafer level hybrid bonding for 3D stacked CMOS image sensors," in Proc. IEEE 66th Electronic Components Technol. Conf. (ECTC), Las Vegas, NV, May 31-Jun. 3, 2016, pp. 869-876., 11 pages. (Abstract Only).

(Continued)

*Primary Examiner* — Uyen Chau N Le
*Assistant Examiner* — Hoang Q Tran
(74) *Attorney, Agent, or Firm* — Hanley, Flight & Zimmerman, LLC (57) ABSTRACT

Apparatus and methods of manufacture are disclosed. In one example the apparatus includes a first substrate that has a first surface, a first optical waveguide that is at or near the first surface of the first substrate, a second substrate that has a second surface. The second substrate is coupled to the first substrate at an interface. The apparatus also has a photonic integrated circuit (PIC) with a portion at or near the second surface. The PIC is in alignment with and optically coupled to the first optical waveguide across the interface.

31 Claims, 7 Drawing Sheets

(56) References Cited

OTHER PUBLICATIONS

European Patent Office, "Extended European Search Report," issued in connection with European Application No. 22178892.0, issued on Nov. 2, 2022, 10 pages.

Thacker et al., "Hybrid-integrated Silicon Photonic Bridge Chips for Ultralow-energy Inter-chip Communications," Optoelectronic Interconnects and Component Integration XI, vol. 7944, No. 1, Jan. 2011, pp. 1-11.

Beausoleil, "Large-scale Integrated Photonics for High-performance Interconnects," ACM Journal on Emerging Technologies in Computing Systems, ACM, vol. 7, No. 2, May 2011, pp. 1-54.

* cited by examiner

FIG. 11 ized in the X, Y
APPARATUS AND METHOD OF MANUFACTURING A VERTICALLY DISAGGREGATED PHOTONIC DEVICE

FIELD OF THE INVENTION

The invention relates to hybrid bonding of photonic devices.

BACKGROUND

Recent advances in hybrid bonding technology for emerging high-volume wafer-to-wafer and die-to-wafer 3-D stacking provide sub-micron alignment accuracy in the X, Y (laterally) directions and the Z (vertically) direction between the two wafers/dies that are hybridly bonded at an interface. Additionally, hybrid bonding allows essentially zero die gap in the Z direction with covalent bonding across the interface.

The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular. In general, the same reference numbers will be used throughout the drawing(s) and accompanying written description to refer to the same or like parts. As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another. Notwithstanding the foregoing, in the case of a semiconductor device, "above" is not with reference to Earth, but instead is with reference to a bulk region of a base semiconductor substrate (e.g., a semiconductor wafer) on which components of an integrated circuit are formed. Specifically, as used herein, a first component of an integrated circuit is "above" a second component when the first component is farther away from the bulk region of the semiconductor substrate than the second component. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real-world imperfections. As used herein "substantially real time" refers to occurrence in a near instantaneous manner recognizing there may be real-world delays for computing time, transmission, etc. Thus, unless otherwise specified, "substantially real time" refers to real time+/−1 second.

DETAILED DESCRIPTION

High-bandwidth interconnects depend on photonic devices such as integrated lasers, resonant-ring modulators (RRMs), and resonant-ring photodetectors (RRPDs) for optical signaling over optical waveguides, connectors, and/or fibers at one or more (e.g., a combination of) specific wavelengths. The resulting photonic dies or optical integration can be expensive. For example, a large area can be required for waveguide routing to optical connectors at the edge of a package or outside a thermal solution such as a heat spreader/sink.

An optical signal is defined herein as an electromagnetic signal in the optical spectrum. The optical spectrum is defined herein as a light portion of the electromagnetic spectrum across a range of wavelengths including infrared, the visible spectrum, ultraviolet, and any other wavelengths that can be utilized for signaling purposes.

In some examples, precise 3-D semiconductor die stacking by hybrid bonding is utilized to bring a separately fabricated optically active region/element of a one or more photonic devices disposed in one die into a required close proximity to an optical waveguide disposed in another die. In different examples, a given die may be referred to also as a substrate or wafer and will be mainly referred to as a substrate in further examples below. The optically active region/element of a given photonic device in different examples can be any one of an optically active region of a hybrid laser, the resonant ring of a RRM, the resonant ring of a RRPD, or the input/output waveguide of any other needed photonic device.

As used herein, an "optically active" region or element of a photonic device is defined as a region or element of a device that is capable of actively performing functions on or with optical signals (e.g., light, electromagnetic waves), or is capable of having multiple functional states that are actively switched between, or is capable of being powered from a voltage (e.g., a bias voltage) to perform a function. An optically active region of a photonic device may be referred to as a photonic integrated circuit (PIC). In some examples, a modulator, a photodetector, and a hybrid laser are herein considered optically active elements (e.g., photonic integrated circuit elements).

As used herein, an "optically passive" region or element is defined as a region or element of a photonic device with a structure that does is not capable of performing the active functions described above related to optically active regions or elements. For example, an optically passive element may guide light (e.g., carry an electromagnetic wave, reflect an electromagnetic wave, etc.) but does not actively perform functions on that light. In some examples, waveguides and static mirrors are herein considered optically passive elements.

In many examples, the optical waveguide is disposed in a substrate that is used primarily for optical routing. A region referred to as optically active is defined herein as a photonic integrated circuit (PIC). The The vertical separation of different optical elements of photonic devices disposed in separately fabricated substrates can be referred to as vertical disaggregation. Hybridly bonding these substrates together in a precise 3-D stacked configuration couples the optical elements together, aggregating (e.g., photonically coupling) the optical elements to create fully functional photonic devices. Hybrid bonding provides sub-micron alignment accuracy between the two substrates that are hybridly bonded at an interface. Hybrid bonding allows dense electrical connections as well as optical connections to be made at the same time across the interface, for example to facilitate electrical signal connectivity and optoelectronic control. As a result, the substrate (sometimes referred to as a base die) including the optical waveguide can be optimized for waveguiding, performance, and/or cost. For example, the substrate can be a glass substrate with an interface to external optical fibers.

Figure 1:
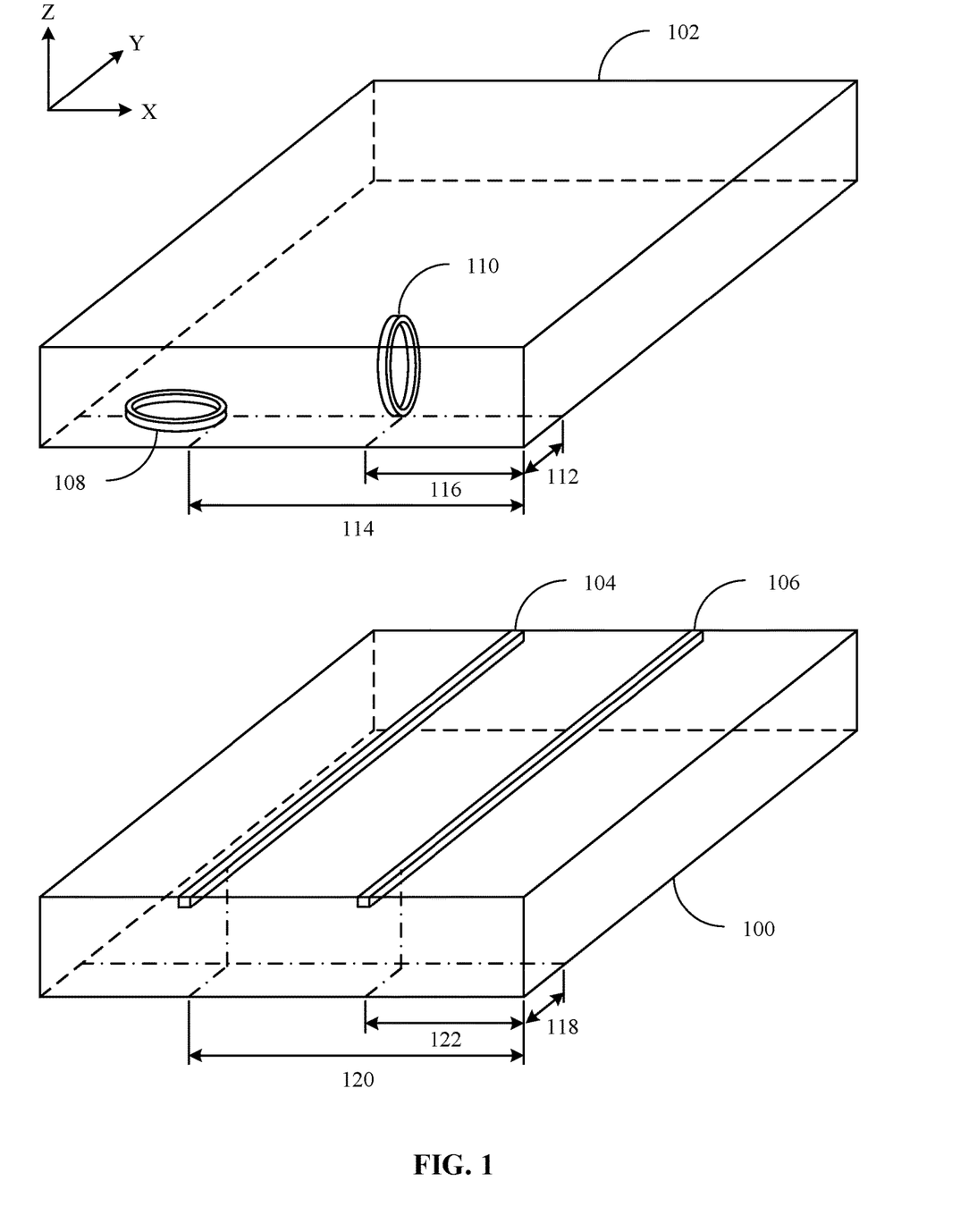
FIG. 1 is a schematic illustration of two example semiconductor substrates that include vertically disaggregated elements of a photonic device prior to hybrid bonding.

FIG. 1 is a schematic illustration of two example semiconductor substrates 100, 102 that include vertically disaggregated elements of a photonic device. In the example of FIG. 1, the substrates 100, 102 are separate. As such, FIG. 1 depicts the substrates 100, 102 at an interim point of fabrication. The example illustration in FIG. 1 is shown in a modified isometric view for clarity. The isometric view illustrates a volumetric three-dimensional (X,Y,Z) space where the X-direction is measured left and right, the Y-direction is measured forward and backward, and the Z-direction is measured up and down (as shown by the coordinate axes in the upper left).

In the illustrated example, the first substrate 100 and second substrate 102 include a semiconductor material. In different examples, the semiconductor material may be silicon, gallium arsenide, germanium, glass, or one or more other known semiconductor materials. The first substrate 100 may be referred to as a base die. In some examples, the first substrate includes optically passive elements.

The example first substrate 100 includes a first optical waveguide 104 and a second optical waveguide 106. For illustrative purposes in FIG. 1, two different examples of vertically disaggregated photonic devices are shown. Specifically, the example illustrates the first substrate 100 including two optical waveguides 104, 106, but in other examples, there may be one optical waveguide or three or more optical waveguides included in the first substrate 100. Each waveguide 104, 106 included in the example first substrate 100 guide electromagnetic waves over its distance. An optical waveguide is an example of an optically passive element. In different examples, the first and second optical waveguides 104 and 106 are implemented by optical fiber, transparent dielectrics made of plastic or glass, and/or any other known optical waveguide material.

In this example, the first and second optical waveguides 104 and 106 are disposed in the first substrate 100 when the substrate 100 is fabricated. In another example, the first and second optical waveguides 104 and 106 are added to the first substrate 100 after the substrate is fabricated. As used herein, "being disposed in the first substrate 100" refers to the first and second optical waveguides 104 and 106 being located within the volumetric three-dimensional space of the example first substrate 100. As illustrated in the example in FIG. 1, the upper surfaces of the first and second optical waveguides 104 and 106 are generally at the same (or a substantially similar) planar Z-height. "Substantially similar" in planar Z-height refers to being similar enough to allow for hybrid bonding to effectively take place across at least a surface region of the example first substrate 100 where the surface region includes both a portion of an optical waveguide (104 and/or 106) and a portion of the semiconductor material of the example first substrate 100 adjacent to the portion of the optical waveguide (104 and/or 106). Additionally, in the illustrated example in FIG. 1 the first and second optical waveguides 104 and 106 are significantly shallower in Z-height than the height of the example first substrate 100. In other examples, the delta in Z-height between the first and second optical waveguides 104 and 106 and the Z-height of the first substrate 100 is smaller than shown in FIG. 1 (e.g., the optical waveguide and the substrate could have equal Z-heights).

In the illustrated example in FIG. 1, the second substrate 102 includes a first optically active photonic device 108 and a second optically active photonic device 110. In the illustrated example in FIG. 1, each optically active photonic device is a resonant ring modulator (RRM) that includes an optical waveguide ring element 110. To simplify the focus of FIG. 1, not all elements of RRMs are shown. Additional elements in RRMs are described below in reference to FIG. 5.

For illustrative purposes to show two different examples of vertically disaggregated photonic devices, the example second substrate 102 includes two RRMs, RRM 108 and RRM 110. RRM 108 is oriented parallel (in a horizontal orientation) in an X,Y plane of the second substrate 102 parallel with the X,Y plane of the first substrate 100. The second substrate 102 of this example is a chiplet substrate.

The RRM 110 is oriented in a vertical orientation perpendicular to both the X,Y plane of the second substrate 102. In the illustrated example there are two RRMs included in the second substrate 102. In other examples, there can be one RRM or three or more RRMs included in the second substrate 102. As illustrated in the example in FIG. 1, at least a portion of the lower surfaces of the RRM 108 and the RRM 110 are generally at the same (or a substantially similar) planar Z-height as the lower surface of the second substrate 102. In other examples, there are one or more additional optically active photonic devices other than RRMs in the substrate 102.

Hybrid bonding is utilized to couple the first substrate 100 to the second substrate 102. Specifically, in reference to the example substrate orientation illustrated in FIG. 1, the upper surface of the first substrate 100 is positioned to be hybridly bonded to the lower surface of the second substrate 102.

In order for hybrid bonding to effectively couple an RRM to a waveguide, precise disposition of the RRMs and optical waveguides within their respective substrates 100, 102 is needed to align regions that are to be hybridly bonded. For example, accurately disposing the horizontal RRM 108 at a specific X,Y location (112,114) of the second substrate 102 allows alignment during hybrid bonding to a corresponding region at X,Y distances (118,120) from a specific point such as a corner of the substrate 100. And accurately disposing the vertical RRM 110 at a specific X,Y location (112,116) of the second substrate 102 allows alignment during hybrid bonding to a corresponding region at X,Y distances (118, 122) from a specific point such as a corner of substrate 102. In many examples, one of several known alignment methods are utilized to achieve accurate positioning of the RRMs 108, 110 and corresponding waveguides 104, 106.

Although the first substrate 100 is shown in the illustrated example as being the same size as the second substrate 102, in some examples the two substrates are not the same size. In many examples, the first substrate 100 is larger than the second substrate 102 for cost effectiveness and routing efficiency purposes of the first and second optical waveguides 104 and 106.

Figure 2:
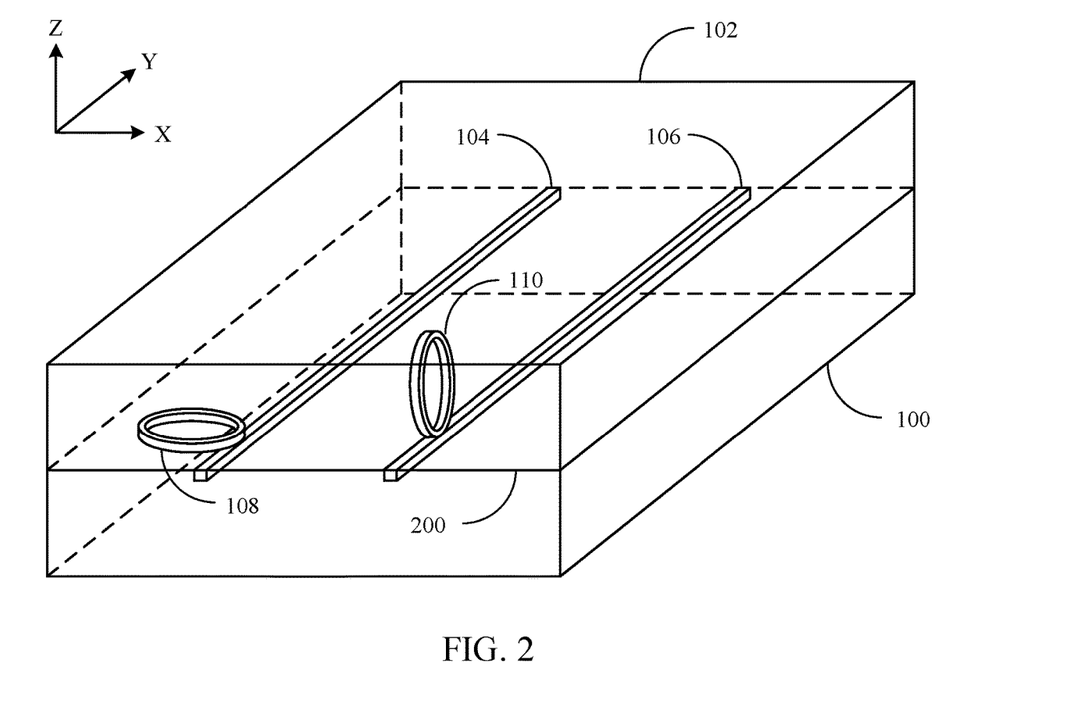
FIG. 2 is a schematic illustration of the example semiconductor substrates of FIG. 1 after hybrid bonding.

FIG. 2 is a schematic illustration of the example semiconductor substrates 100, 102 of FIG. 1 after hybrid bonding. The example illustration in FIG. 2 is shown in a modified isometric view for clarity.

FIG. 1 illustrated the first substrate 100 and the second substrate 102 prior to hybrid bonding. FIG. 2 illustrates the substrates 100, 102 after a hybrid bonding process has occurred. With the hybrid bonding complete, the upper surface of the first substrate 100 and the lower surface of the second substrate 102 are physically coupled (i.e., attached) at a first interface 200. The first interface 200 is the bonding surface and/or material that couples the two substrates together. Hybrid bonding allows the aforementioned surfaces of the first substrate 100 and the second substrate 102, as well as elements disposed in those substrates at or near the bonded surfaces to be in contact and/or in extremely close proximity to one another. As a result, elements disposed at or near the upper surface of the first substrate 100 can be coupled (i.e., hybridly bonded) to corresponding optical and/or electrical elements at or near the lower surface of the second substrate 102 within 0.5 to 1.0 micrometers (µm) from each other (i.e., hybrid bonding proximity). In the illustrated example, a region of the horizontal RRM 108 is coupled within a hybrid bonding proximity to a region of the first optical waveguide 104 and a region of the vertical RRM 110 is coupled within a hybrid bonding proximity to a region of the second optical waveguide 106.

Figure 3:
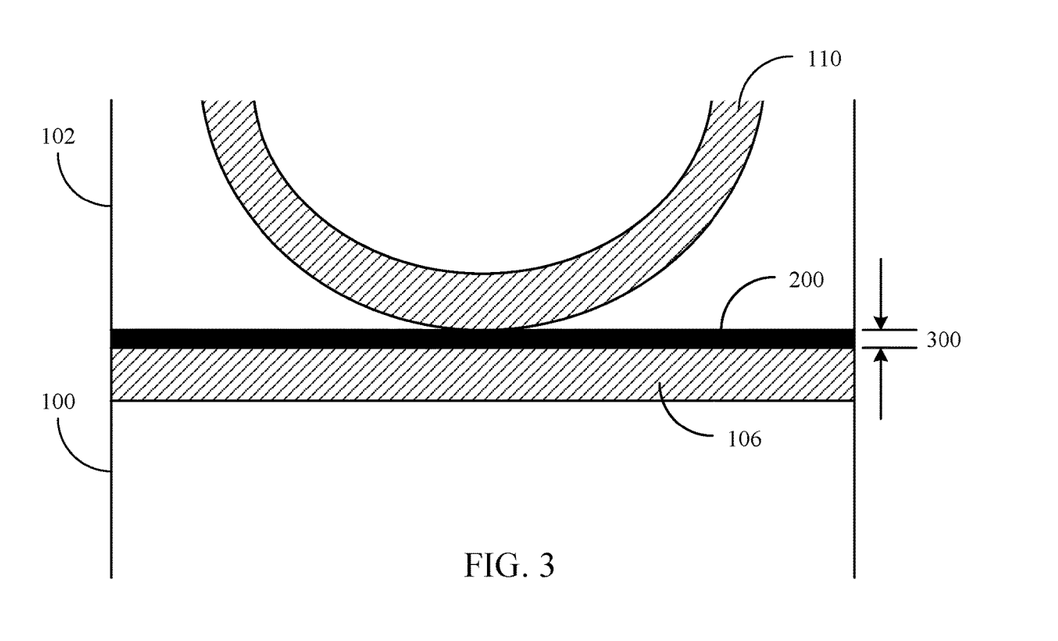
FIG. 3 is a schematic illustration of a cross section of example portions of the semiconductor substrates of FIG. 2 after hybrid bonding.

FIG. 3 is a schematic illustration of a cross section of portions of the example semiconductor substrates 100, 102 of FIGS. 1 and 2 after hybrid bonding. In the illustrated example, the cross section shown is a close-up view of a region of the first substrate 100 that includes the second waveguide 106 and a region of the second substrate 102 that includes the vertical RRM 110. An example of the first interface 200 is also shown.

In the illustrated example, when the first substrate 100 is hybridly bonded to the second substrate 102, the first optical waveguide 106 becomes optically coupled to the vertical RRM 110. As used here, "Optically coupled" is defined to mean two or more elements are in such proximity to each other such that an optical signal transmitted in one element can affect an optical signal transmitted in the other element, and/or the optical signal in one element can transfer into the other element. For example, an optical signal being transmitted through the second optical waveguide 106 can be affected by an optical signal being transmitted through the vertical RRM 110.

In the illustrated example, the interface between the two substrates has a thickness of 0.5 to 1.0 µm (shown with the measurement 300). In other examples, the thickness of the interface is less than 0.5 µm. In yet other examples, the thickness of the interface 200 is more than 1.0 µm, although as thicknesses increase significantly the effectiveness of the optical coupling of the elements decreases.

Figure 4:
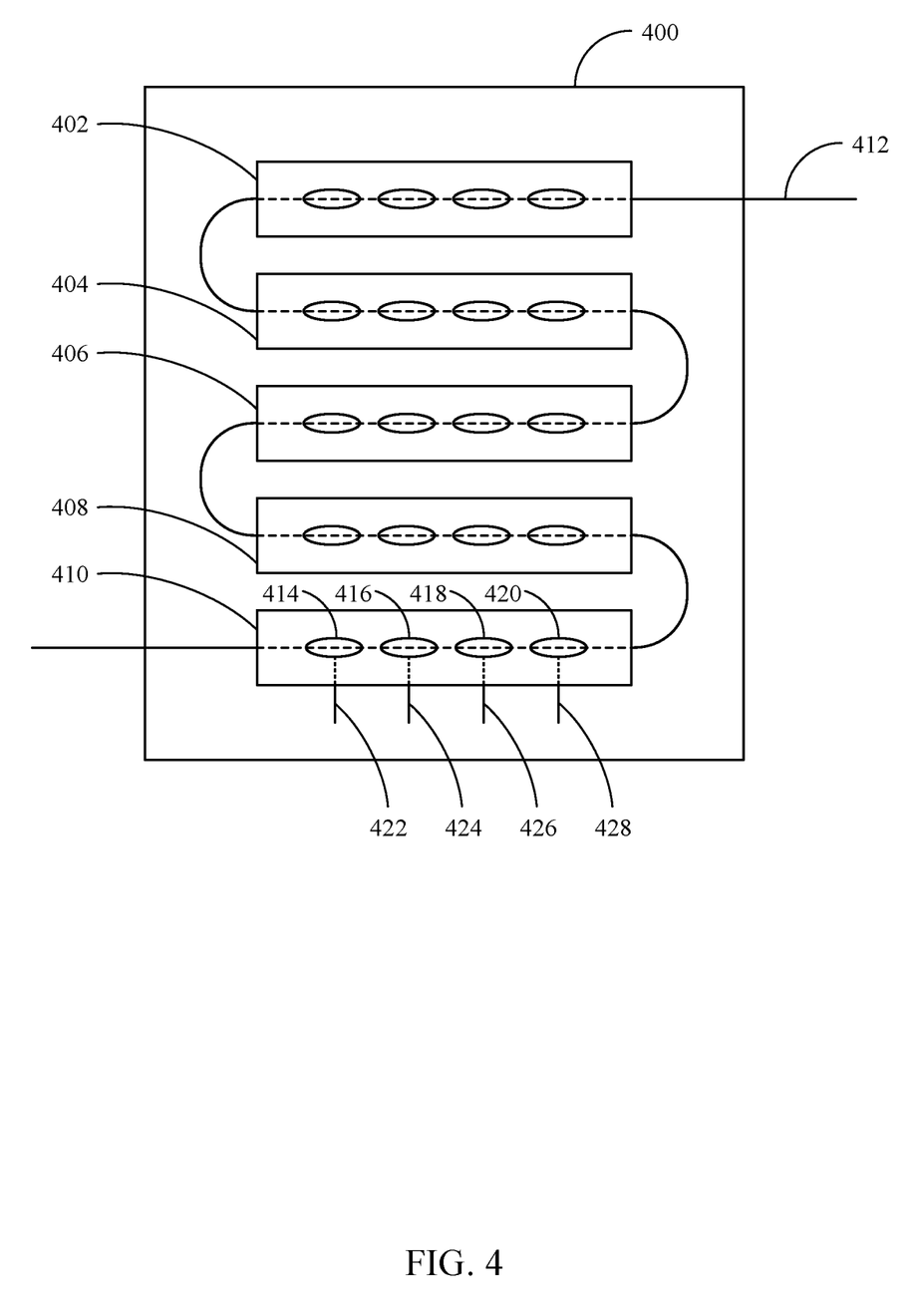
FIG. 4 is a schematic illustration of an example base semiconductor substrate with a meandering optical waveguide hybridly bonded to multiple chiplet substrates.

FIG. 4 is a schematic illustration of an example base semiconductor substrate with a meandering optical waveguide hybridly bonded to multiple chiplet substrates 402, 404, 406, 408, and 410. The example illustration in FIG. 4 is shown in a top-down view. The dotted lines denote portions of waveguides and other transmission lines that are obscured below substrates that are closer to the viewer's relative position.

In the illustrated example, the chiplet substrates (402, 404, 406, 408, and 410) are hybridly bonded to the top surface of the base substrate 400. An interface is located between each chiplet substrate and the corresponding area of the substrate 400 (the interfaces are not visible in FIG. 4). In different examples, each chiplet substrate (402-410) may have unique functionality or may have the same functionality as one or more of the other chiplet substrates. In the illustration shown in FIG. 4, the "top" surface or the "upper" surface of the example base substrate 400 is the surface shown facing a viewer of the illustration. Additionally, in the illustration shown in FIG. 4, the "lower" surface or "bottom" surface of each example chipset substrate (402-410) is the surface facing away from the viewer of the illustration. Thus, as shown in the illustrated example, the top surface of the base substrate 400 is hybridly bonded to the bottom surfaces of the respective chiplet substrates (402-410). An optical waveguide 412 is disposed in the example base substrate 400.

In the illustrated example, the optical waveguide 412 traverses a serpentine or meandering path (i.e., turning back and forth across the base substrate 400). Having the optical waveguide 412 disposed in this manner allows a greater distance of the optical waveguide to be exposed to the top surface of base substrate 400. This, in turn, allows a greater number of chiplet substrates to be hybridly bonded to the optical waveguide 412 over a surface area on the example base substrate 400. Although in FIG. 4, the path is serpentine, in other examples, the meandering layout of the optical waveguide 412 can be any other layout configuration, such as using 90-degree right angle turning structures (e.g., mirrors placed at angles) instead of curved turns or a layout of chiplet substrates that are not parallel to each other.

In the example of FIG. 4, one or more optically active photonic device elements are disposed in each chiplet substrate (402-410). In the illustrated example, there are four optically active photonic device elements disposed in each chiplet substrate (402-410). For example, in chiplet substrate 410, there are optically active photonic device elements 414, 416, 418, and 420. In some examples, the elements 414-420 are resonant rings of either RRMs or RRPDs. In other examples, the elements 414-420 are optically active regions of a hybrid laser. In yet other examples, elements 414-420 are the input/output waveguides of one or more other photonic devices. In some examples, each chiplet substrate 402-410 has a homogeneous set of optically active photonic device elements (i.e., all elements shown in a given chiplet substrate, such as elements 414-420 in chiplet substrate 410, are the same type of element). In other examples, the set of optically active photonic device elements in a given chiplet substrate are heterogeneous. For example, elements 414 and 418 can be resonant rings and elements 416 and 420 can be input/output waveguides. Some or all of the chiplet substrates may differ from one or more of the other chiplet substrates.

As discussed above, optically active photonic device elements utilize at least one electrical input. The electrical current applied on a given input can be modified to cause the optically active photonic device element to perform its function, change its state, and/or change its function. In other examples, the voltage applied on a given input changes. In some examples, a specific region of the optical waveguide includes a resonant ring with metallic (e.g., copper) leads on one or more sides of the region of the ring. One or more gaps can be left in the ring with a metallic lead on each side of the gap. The gap can be filled with an electro-optical material (e.g., a polymer). This electro-optical material can change the refractive index of the ring depending upon the amount of electrical current applied to the leads. The effective propagation constant (i.e., the refractive index) of the ring is dependent upon the refractive index of the material. The electrical signal applied to the ring can be used to tune the ring.

As illustrated in FIG. 4, there are electrical inputs 422, 424, 426, and 428 disposed in the base substrate 400. The electrical inputs 422, 424, 426, 428 are for the optically active elements 414, 416, 418, and 420 respectively. In many examples, each electrical input can include multiple leads to allow for a complete circuit to transmit the electrical signal described above. The illustrated example shows electrical inputs 422-428 disposed at a portion of the surface of the base substrate 400, for ease of visual explanation. In many other examples, electrical inputs are disposed vertically down into base substrate 400 directly underneath a chiplet substrate 410 using vias or other electrical transmission line routing mechanisms. Additionally, FIG. 4 only shows electrical inputs 422-428 for chiplet substrate 410, but there are electrical inputs for each of the other chiplet substrates (402, 404, 406, and 408).

Other optically active photonic device elements also utilize electrical inputs. For example, the photodetector element of a RRPD can be considered an optically active device. Photodetectors often include a semiconductor diode with a p-n junction and require a source of energy, a reverse bias voltage, to operate.

Figure 5:
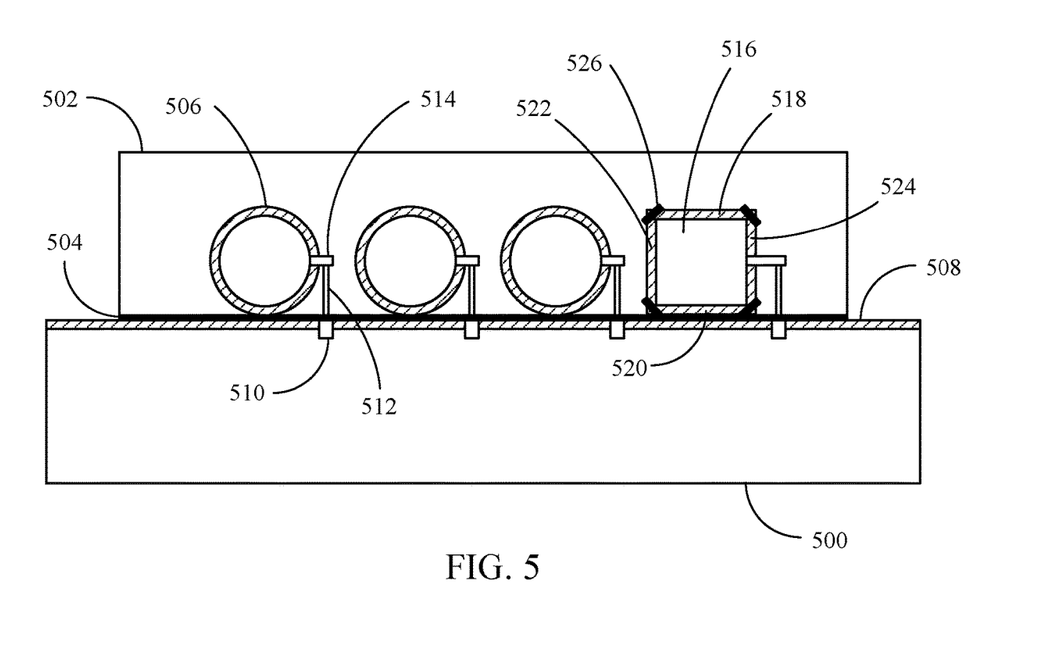
FIG. 5 is a schematic illustration of a cross-sectional view of the example base semiconductor substrate of FIG. 4 hybridly bonded to a chiplet substrate.

FIG. 5 is a schematic illustration of a cross-sectional view of a base semiconductor substrate hybridly bonded to a chiplet substrate. In the illustrated example, base substrate 500 is hybridly bonded to the chiplet substrate 502 at an interface 504. In many examples, the interface 504 is a co-planar $SiO_2$ interface. The portion of the hybrid bonding process described above focused mainly on the optical coupling capabilities, which can also be referred to as solid state bonding. The solid-state bonding phase allows for elements of optically active photonic devices, such as RRM 506 in FIG. 5, to be optically coupled to optical waveguides, such as waveguide 508, across interface 504, through a covalent bond (e.g., $SiO_2$ to $SiO_2$).

In many examples, hybrid bonding of the optical and electrical connections are performed in a serial manner (e.g., the optical connections are hybridly bonded first and then the electrical connections are hybridly bonded second). In the illustrated example, the first phase of hybrid bonding couples corresponding optical elements to form a solid-state bond across the interface 504. Once the solid-state bond phase has completed, then one or more electrically conductive (e.g., copper) pads are coupled across the example interface 504 during a second phase of the hybrid bonding process. In other examples, a different electrically conductive material other than copper is used in the construction of the pads. During the initial solid-state bonding phase, the copper pads will not bond to each other because there remains a physical gap in between the copper pads that are slightly recessed (e.g., concave). In the illustrated example, during the second phase, the copper pad 510 and a copper pad at the end of the electrically conductive line 512 are bonded across the interface 504 through an annealing process.

When the copper pads (e.g., 510 and the end of 512) have bonded, then the example optically active photonic device element (e.g., RRM 506) is electrically coupled to an electrically conductive input. The electrically conductive input enables a charge to be introduced to a region 514 at or near the RRM 506. In some examples, the region 514 is a charge modulated region that adjusts a condition (e.g., state) of the RRM 506 when an electric charge is applied across a pad 510 and a line 512. The charge modulated region includes an electro-optical material in many examples. The electro-optical material can be a polymer or another type of material that is responsive to an applied electric field (e.g. a voltage applied to the material).

In some examples, the electrical line 512 includes two electrically conductive lines (such as vias or other metal leads). The electro-optical material can fill a region or space that defines a gap between the ends of the two electrically conductive lines (512). When a voltage is applied to the lines 512, the electrical potential across the gap creates a charge in the electro-optical material and completes an electric circuit between the lines 512. In the example shown in FIG. 5, the RRM 506 modulates to a frequency that is controlled by the electric field applied at the region 514. The modulated frequency can be controlled by changes in the applied voltage. Thus, the example RRM 506 can become a filter at an electromagnetic wavelength (i.e., a light filter) that is either dynamically adjustable using an adjustable voltage or is set with a fixed voltage. As shown in the illustrated example, the other three optically active photonic device elements displayed in the chiplet substrate 502 (shown as resonant rings) also have at least one pad, one line, and a charge modulated region in proximity to each ring.

In some examples, each of the RRMs in the chiplet substrate 502 modulates a different frequency in a transmitted optical signal carried by waveguide 508. In some examples, one or more additional ring resonators that do not have a coupled modulator (i.e., optically passive ring resonators). A passive ring resonator is tuned to a specific frequency based on the circumference/diameter of the ring and the ring material. In other examples, instead of RRMs in chiplet substrate 502, there may alternatively be RRPDs (e.g., in a receiver chiplet substrate), hybrid laser elements (e.g., in a transmitter chiplet substrate), input/output waveguide elements, and/or any other optically active photonic device elements, and/or passive optical elements. Additionally, in some examples there may be either a homogeneous or heterogeneous set of optically active photonic device elements per chiplet substrate. In other examples, there may be a combination of active and passive photonic device elements per chiplet substrate. In yet other examples, there may be other electrical circuits per chiplet substrate in addition to one or more active and/or passive photonic device elements.

The example interface 504 has a sub-micron thickness because the surfaces of the substrates to be bonded are polished to a precise plane through a chemical mechanical polishing (CMP), which allows for close contact at the interface 504. The optical waveguide 508 and the optically active elements of photonic devices, such as vertical RRM 506 are disposed at or close enough to the surfaces of their respective substrates to allow photons to be sent across the interface 504. As described above, this can be referred to being "optically coupled" across the interface 504.

In other examples, a second waveguide similar to the optical waveguide 508 is disposed in the chiplet substrate 502 at or near its surface at the interface 504. The second waveguide allows photons to transfer directly from the optical waveguide 508 in the base substrate 500 to the second waveguide in the chiplet substrate 502.

In many examples, the ring resonators are disposed vertically in the chiplet substrate 502 to pack more ring resonators in a smaller (X, Y) area of the substrate since a good portion of the RRM structure is in the vertical direction and, therefore, can extend away from the interface in the Z-direction. In the illustrated example in FIG. 5, four RRMs are shown. In other examples, there may be more or less RRMs in chiplet substrate 502 than the four shown in FIG. 5.

While only vertical ring resonators are shown in the illustrated example in FIG. 5, in many other examples the chiplet substrate 502 alternatively includes one or more horizontal RRMs, such as the horizontal RRM 108 in FIG. 1. An example horizontal optical waveguide ring, such as the ring of the RRM 108 in FIG. 1, can be fabricated in a horizontal planar fashion on a wafer and then disposed in that same plane orientation along the X,Y axes in a substrate.

An example vertical optical waveguide ring can be fabricated in multiple ways. For example, a vertical optical waveguide ring, such as the RRM 506 in FIG. 5, can begin the fabrication process similarly to a horizontal optical waveguide ring (i.e., being fabricated in a horizontal planar fashion on a wafer). But prior to disposition in a substrate, the fabricated ring can then be rotated from a parallel position to a perpendicular position relative to the X,Y plane of the substrate (502 in this example). At that point the substrate is fabricated with the optical waveguide ring dispositioned in a vertical manner within it.

In another example, the optical waveguide ring may not be round, but rather a closed square, rectangle, or oval loop that is oriented vertically (i.e., perpendicular to the X,Y plane of the substrate). An example square optical waveguide ring 516 is shown in FIG. 5. To fabricate this example ring, In this example, a first optical waveguide layer is fabricated (shown as waveguide 518). Then a second optical waveguide layer is fabricated (shown as waveguide 520). Then two optical vias (522 and 524) are coupled to the ends of the two waveguides 518 and 520 to complete the loop. In many examples, each coupling between an optical via and an optical waveguide utilizes a 90-degree turning component, such as component 526. In different examples the 90-degree turning component are mirrors, gratings, or other components that can turn an optical signal (e.g., 90-degrees) at a coupling location.

While the square ring is shown in the example in FIG. 5 next to the round rings, in many examples, a homogeneous set of rings that are either all round or all rectangular/square are disposed in the substrate 502.

In some examples, one or more of the RRMs have a control input that is used to fine tune the resonance of the resonance ring. For example, fine tuning a given ring may be accomplished by a micro-heater element coupled to the ring to change the frequency of the ring. In another example, the voltage applied to the electro-optical polymer can also be used to fine tune the frequency of the ring.

Figure 6:
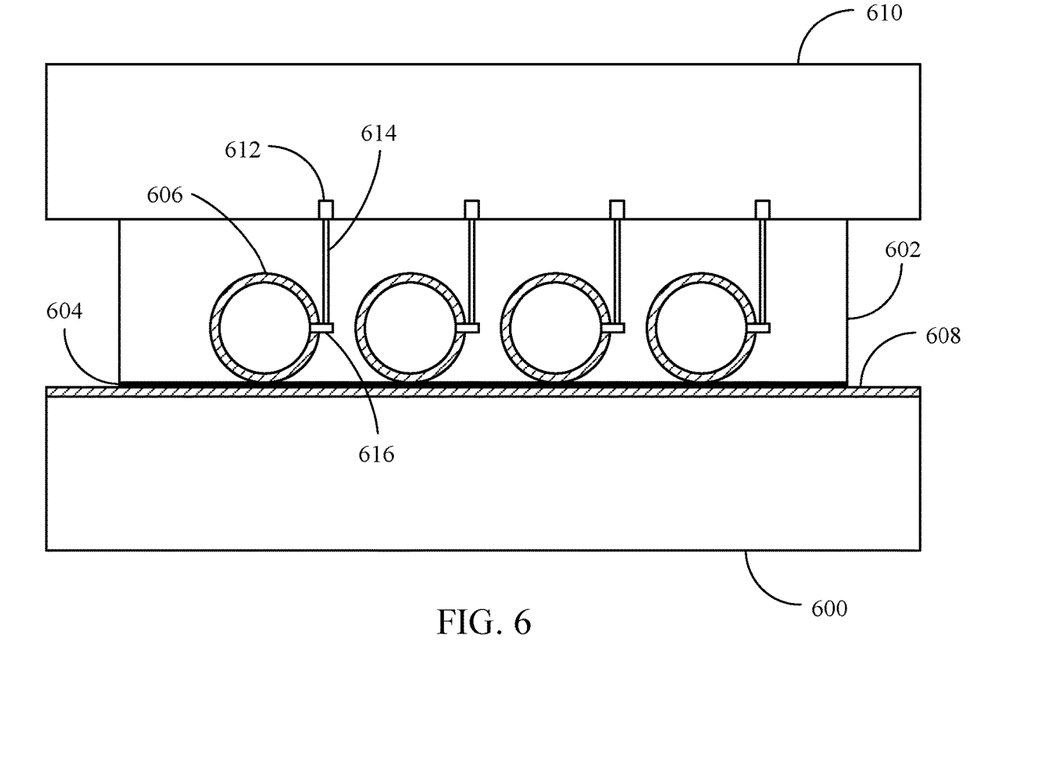
FIG. 6 is a schematic illustration of a cross-sectional view of an example 3-D stack of three semiconductor substrates.

FIG. 6 is a schematic illustration of a cross-sectional view of a 3-D stack of three semiconductor substrates. The illustrated example is similar to the example shown in FIG. 5 with the exception of the electrically conductive input source location and disposition.

Specifically, in the illustrated example of FIG. 6, the base substrate 600 is hybridly bonded to chiplet substrate 602 at an interface 604. The hybrid bond at the interface 604 allows optically active photonic device elements, such as RRM 606 (as well as the three other RRMs shown) to be optically coupled to optical waveguide 608. In the example in FIG. 6, unlike the example in FIG. 5, the RRMs are electrically coupled to electrically conductive pads, such as the pad 610, that are disposed on a third substrate 610. In different examples, the substrate 610 may be a compute die/substrate, an input/output (I/O) controller substrate, a custom controller substrate, or any other type of substrate that could be packaged in a 3-D substrate (i.e., die) stack with the base substrate 600 and the chiplet substrate 602.

There are many reasons why it may be advantageous to have the electrical input to the RRMs originate from a substrate other than the base substrate 600, such as layout and manufacturing efficiencies, costs, and customizations, among other reasons. Therefore, in the illustrated example, the first pad 612 (along with the other pads shown but not labeled in third substrate 610) are coupled to the upper surface of the chiplet substrate 602. Because there is no optical coupling necessary between the chiplet substrate 602 and the third substrate 610, hybrid bonding is not necessary, although it could be employed. In other examples, other die stacking techniques are utilized, such as simple solder bumps (or any other known die stacking/coupling technique) to couple the electrically conductive pads at the bottom surface of the third substrate 610, with the electrically conductive pads at the top surface of the chiplet substrate 602. An example of the coupling is shown where the first pad 612 is coupled to the pad at the end of the electrical line (e.g., via) 614.

As in FIG. 5, each coupled pair of pads in FIG. 6 provides an electrical input to an electro-optically active region disposed on or near a RRM. For example, electro-optically active region 616 is supplied voltage from the first pad 612 through the electrical line 614. Three other electro-optically active regions are shown in FIG. 6 but not labeled. Other examples include other optically active photonic device elements and may also exhibit more electrical inputs per device element, depending on the complexity of the needed control functionality.

In some examples, the base substrate 600 is not limited to optically passive elements, but also can also contain one or more optically active photonic device elements. For example, the base substrate could have one or more optically active photodetectors disposed within it. The specific disaggregation of photonic device elements across the multiple substrates is an application specific layout decision for each package.

Figure 7:
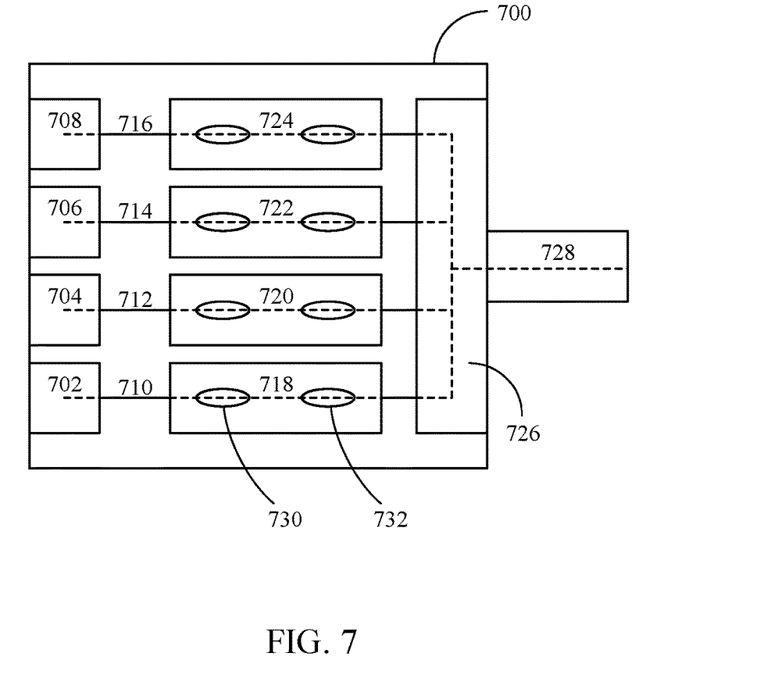
FIG. 7 is a schematic illustration of an example hybrid laser array transmission subsystem.

FIG. 7 is a schematic illustration of a hybrid laser array transmission subsystem. The viewpoint of FIG. 7 is top-down.

The illustrated example shows a base substrate 700 hybridly bonded to four hybrid lasers (702, 704, 706, and 708). More specifically, the optically active element of each of the four hybrid lasers is hybridly bonded to the base substrate 700. The example optical waveguides 710, 712, 714, and 716 are disposed in the base substrate 700. In the example shown, the waveguides 710-716 originate from a location at the interface between each of the hybrid lasers 702-708 and the base substrate 700. The hybrid lasers 702-708 transmit optical signals along the optical waveguides 710-716.

When the signals in the waveguides reach the example chiplet substrates 718, 720, 722, and 724, respectively, certain wavelengths are filtered out of the signals. The filtering occurs by modulating the resonant frequency of each RRM disposed in each chiplet substrate. For example, the RRMs 730 and 732 in chiplet substrate 718 are each utilized as a filter of an electromagnetic wave at a certain frequency. As the frequency modulates off and on, a data signal can be created at that frequency.

In many examples, once the signals pass the RRMs they are then combined in a combiner chiplet substrate 726 and are sent as a combined optical signal across a fiber connector 728. The combiner combines individual signals coming from each waveguide (702-708) into a single optical signal on a single fiber waveguide. In other examples, a tree of combiners combines many signals into fewer signals and then fewer signals into one signal, the one signal incorporating all of the signals that were combined at every combination stage.

Figure 8:
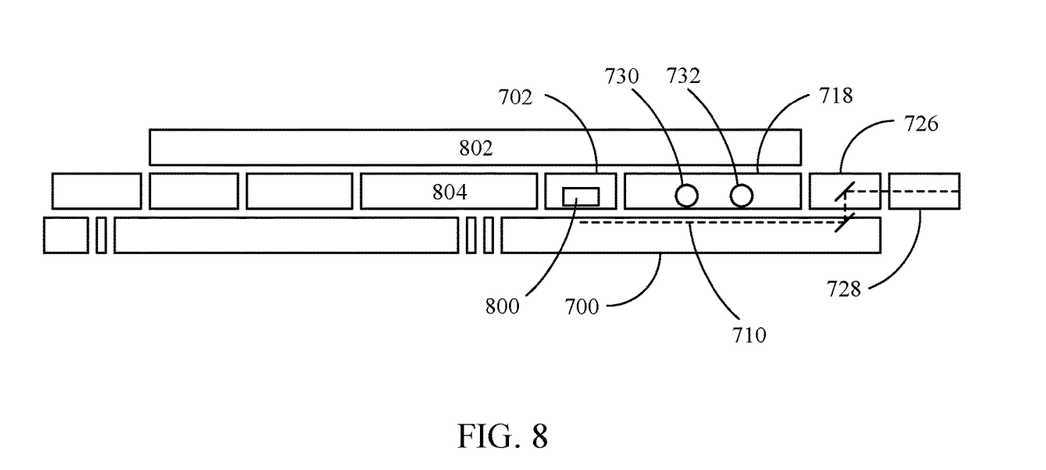
FIG. 8 is a schematic illustration of a cross-section of an example 3-D stack of substrates for a hybrid laser array transmission subsystem.

FIG. 8 is a schematic illustration of a cross-section of the 3-D stack of substrates discussed above in FIG. 7 regarding a hybrid laser array transmission subsystem. FIG. 8 shows a cross-section of a greater portion of the 3-D stack than what was shown in FIG. 7. All components that were shown in FIG. 7 and are also shown in FIG. 8 maintain their numbering from FIG. 7. Additionally, the view of the substrates in the cross-section shows a significant air gap between each one for sake of illustration, but the air gaps may not be present.

As previously discussed above in FIG. 7, the illustrated example shown in FIG. 8 includes a base substrate 700 and a hybrid laser 702 (hybrid lasers 704-708 from FIG. 7 are not visible from the FIG. 8 viewpoint). Example optical waveguide 710 is shown disposed at or near the top surface of base substrate 700.

The illustrated example hybrid laser 702 in FIG. 8 includes an optically active element 800. The optically active element becomes operational in response to an applied voltage. The hybrid laser 702 of this example is hybridly bonded to the base substrate 700 and optically coupled to the optical waveguide 710. As the optical signal is transmitted from the hybrid laser 702 across optical waveguide 710 it reaches the chiplet substrate 718, which is also hybridly bonded to the base substrate 700. Through the hybrid bond, the RRMs 730 and 732 are also optically coupled to the optical waveguide 710 and filter certain frequencies of the optical signal being transmitted across the waveguide 710.

After the example optical waveguide 710 passes the chiplet substrate 718, it reaches a 90-degree turning component to turn the optical signal perpendicular to the X,Y plane of the base substrate 700. This turn is shown in FIG. 8 as turning up in the Z direction towards the top of the example stack. In the cross-section view, the X direction is shown as moving left or right along the dotted line denoting the waveguide 710, whereas the Y direction is not able to be shown as it is oriented into/out of the paper of FIG. 8. In some examples, the 90-degree turning component may be a mirror, a grating, or any other known device capable of turning an optical signal in such a manner.

In the illustrated example, once the waveguide 710 passes the interface at the top surface of the base substrate 700, it is then further disposed in the combiner chiplet substrate 726. The waveguide 710 is then combined with the other optical waveguides from FIG. 7 (the other waveguides are not shown in FIG. 8) to generate a combined signal that is transmitted out to the fiber coupling/connector 728.

In addition to the components of the stack that was shown in a top-down manner in FIG. 7, FIG. 8 also includes additional components of the stack. For example, a compute-I/O die 802 is bonded to the hybrid laser 702 and the chiplet substrate 718. The bonding method for compute-I/O die 802 can be any method that is functionally acceptable for the purpose needed. For example, when a hybrid bond is not needed, the compute-I/O die can be coupled to the hybrid laser 702 and the chiplet substrate 718 using solder bump bonding. Another system-level I/O chiplet substrate 804 is coupled to the compute-I/O die 802 in many examples.

Figure 9:
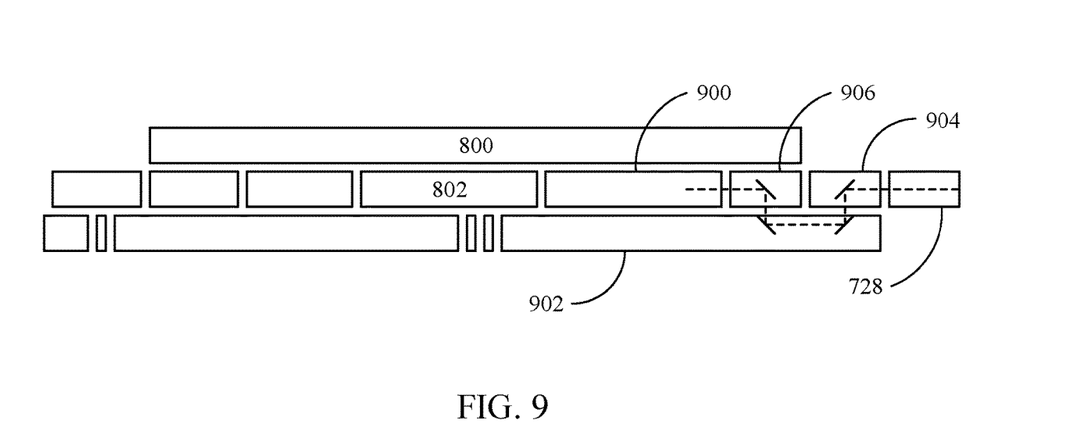
FIG. 9 is a schematic illustration of a cross-section of an example 3-D stack of substrates for the receiving side of an optical signal subsystem.

While FIG. 7 and FIG. 8 described the transmission side of an optical signal subsystem, FIG. 9 is a schematic illustration of a cross-section of a 3-D stack of substrates for the receiving side of an optical signal subsystem. All similar components in FIG. 9 that were shown in FIG. 7 and FIG. 8 maintain their numbering from those previous figures.

The illustrated example shown in FIG. 9 includes an edge-receiving detector chip 900 that can detect optical signals from a connection at the edge of the chip as opposed to from the bottom of the chip. The term "chip" can be used interchangeably herein with die or substrate. In many examples, the detector chip 900 is hybridly bonded to a base substrate 902. The package layout in FIG. 9 is able to obtain an optical signal through fiber connector 728. In many examples, the signal is then routed through an optical waveguide to a 90-degree turning component 904 to allow each optical signal to traverse into the base substrate 902.

Each optical signal is then turned 90-degrees again once in substrate 902 using another 90-degree turning component. After this turn, each waveguide is disposed along the X-axis of base substrate 902 and traverses a portion of the substrate. At a certain location down the X-axis of base substrate 902, each waveguide is turned again 90-degrees, this time in the upward direction, to allow each waveguide to traverse into an example waveguide turning substrate 906. Within the substrate 906, another set of 90-degree turning components is used to turn each waveguide parallel again to the plane of the package components. Once turned, the waveguide then traverses from substrate 906 into the example detector chip 900. The edge of the detector chip 900, in many examples, is optically coupled to the waveguides. The optical signal, routed along the above described waveguide path, is converted into an electrical signal by an optical-to-electrical sensor and then processed in the detector chip 900.

In many examples, the detector chip 900 is bonded (e.g., hybridly bonded, solder-bump bonded, or coupled through any other known bonding process) to compute-I/O die 800. Compute-I/O die 800 can also be bonded/coupled to I/O substrate 802 and/or to any one or more other substrates in the package.

Figure 10:
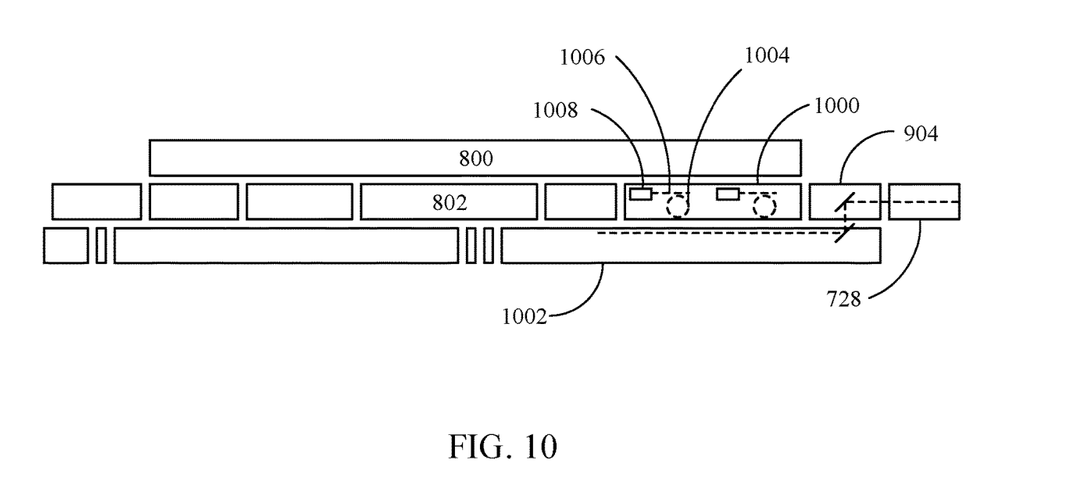
FIG. 10 is a schematic illustration of a cross-section of another example 3-D stack of substrates for the receiving side of an optical signal subsystem.

FIG. 10 is a schematic illustration of a cross-section of a 3-D stack of substrates for the receiving side of an optical signal subsystem. All similar components in FIG. 10 that were shown in FIG. 7 and FIG. 8 maintain their numbering from those previous figures.

The illustrated example shown in FIG. 10 includes a substrate 1000 with one or more RRPDs (two RRPDs are shown in the example in FIG. 10). In many examples, the substrate 1000 is hybridly bonded to a base substrate 1002. The package configuration in FIG. 10 includes a fiber connector 728 to carry an optical signal. In many examples, the signal is then routed through an optical waveguide and then through a 90-degree turning device 904. As discussed above in reference to FIG. 9, the turning device 904 turns the signal down into base substrate 1002.

Once in base substrate 1002, in this example, each waveguide is turned 90-degrees using 90-degree turning components. After this turn, each waveguide is disposed along the X-axis of the base substrate 1002 and traverses a portion of the substrate. At a certain location down the X-axis of the example base substrate 1002, each waveguide, through the hybrid bonding process, is optically coupled to at least one of the optical waveguide ring elements in example substrate 1000. Each ring is tuned to a resonant frequency and pulls the portion of the optical signal at that frequency into the ring, such as ring 1004, which then sends that portion of the signal across another waveguide 1006 situated on the other side of the ring. The optical signal is then received by a photodetector component 1008, which produces a photocurrent in response to the optical signal. In many examples, the photocurrent becomes an input at an optical receiver (not shown).

Figure 11:
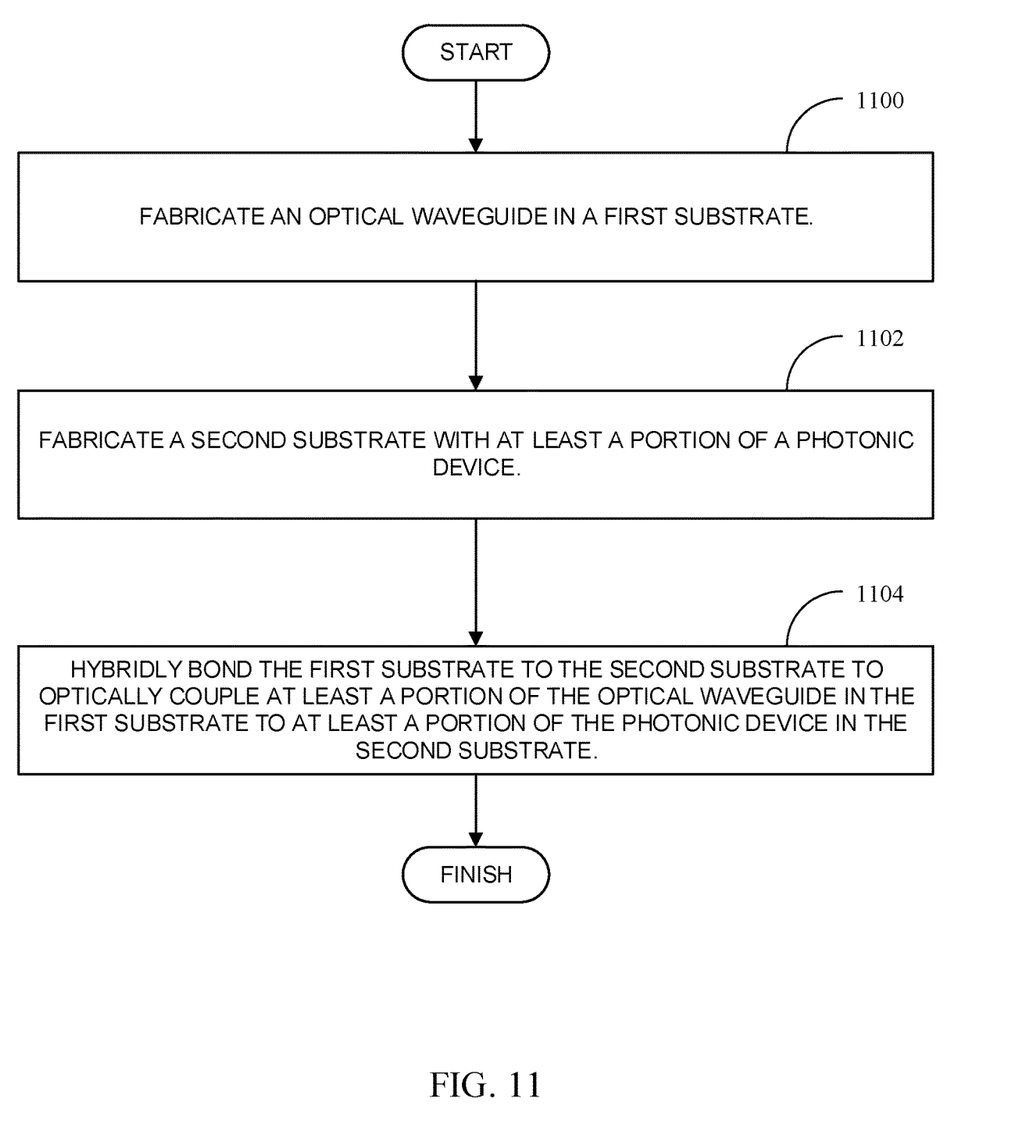
FIG. 11 is a flow diagram of an example method to manufacture a vertically disaggregated photonic device.

While an example manner of implementing the manufacturing of the structure of FIG. 3 is illustrated in FIG. 11, one or more of the elements, processes and/or devices illustrated in FIG. 3 may be combined, divided, rearranged, omitted, eliminated and/or implemented in any other way.

The method of manufacturing a vertically disaggregated photonic device by hybrid bonding starts by fabricating an optical waveguide in a first substrate (block 1100). In different examples, the first substrate includes one or more known semiconductor materials. In different examples, the optical waveguide includes one or more optical waveguide materials such as silicon, glass, polymers, or any other known optical waveguide material. In different examples, the placement and shape of the optical waveguide in the first substrate may be done with any known fabrication technique designed to fabricate substrates including optical waveguides. In one example, the optical waveguide is fabricated and then the first substrate is fabricated around the optical waveguide. In another example, the first substrate is fabricated and then the optical waveguide is fabricated or placed in the first substrate. In yet another example, the first substrate and the optical waveguide are fabricated simultaneously. In some examples, at least a portion of the optical waveguide is placed at or near a surface of the first substrate. Placement of an optical waveguide "near" the surface of a substrate is defined herein as being placed close enough to the surface to allow the optical waveguide to be optically coupled to a second optical waveguide or photonic device element.

Next, the method of manufacturing continues by fabricating a second substrate with at least a portion of a photonic device (block 1102). In different examples, the second substrate includes one or more known semiconductor materials. In different examples, the portion of the photonic device may be a resonant ring for a RRM or RRPD, an element of a hybrid laser, an optical input/output device, or any other known photonic device or portion thereof. In different examples, the placement and shape of the portion of the photonic device in the second substrate may be done with any known fabrication technique designed to fabricate substrates including photonic devices. In some examples, at least a portion of the photonic device is placed at or near a surface of the second substrate.

Finally, the method of manufacturing concludes by hybridly bonding the first substrate to the second substrate to optically couple at least a portion of the optical waveguide in the first substrate to at least a portion of the photonic device in the second substrate (block 1104).

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

From the foregoing, it will be appreciated that example apparatus and methods of manufacture have been disclosed to vertical disaggregate photonic devices. The disclosed apparatus and methods of manufacture improve the efficiency of using a computing device by enabling high-bandwidth, power-efficient, and cost-optimized photonic I/O for computing products, including those computing products that are present in datacenters and high-performance computing environments. More specifically, semiconductor packages that have optical signaling can utilize the apparatus and methods of manufacture to optimize a base die for waveguiding and cost. The apparatus and methods of manufacture are accordingly directed to one or more improvement(s) in the functioning of a computer.

Although certain example apparatus and methods of manufacture have been disclosed herein, the scope of coverage of this patent is not limited thereto. On the contrary, this patent covers all apparatus and methods of manufacture fairly falling within the scope of the claims of this patent. Further examples and combinations thereof include the following:

Example 1 includes an apparatus, comprising a first substrate, the first substrate having a first surface, a first optical waveguide at or near the first surface of the first substrate, a second substrate, the second substrate having a second surface, the second substrate coupled to the first substrate at an interface, and a photonic integrated circuit (PIC), at least a portion of the PIC at or near the second surface, the PIC in alignment with and optically coupled to the first optical waveguide across the interface.

Example 2 includes the apparatus of example 1, wherein the second substrate is hybridly bonded to the first substrate at the interface.

Example 3 includes the apparatus of example 2, wherein the first substrate is optically passive.

Example 4 includes the apparatus of example 1, further including a charge modulated region in the second substrate, the charge modulated region to adjust a state of the PIC in response to a signal.

Example 5 includes the apparatus of example 4, wherein the second substrate includes an electro-optical material in the charge modulated region of the second substrate, the electro-optical material is responsive to the signal, and at least one electrically conductive input electrically coupled to the electro-optical material.

Example 6 includes the apparatus of example 4, further including a ring resonator.

Example 7 includes the apparatus of example 6, wherein the ring resonator is a component of a ring resonator modulator.

Example 8 includes the apparatus of example 3, wherein the PIC includes a photodetector.

Example 9 includes the apparatus of example 3, wherein the PIC is a component of at least one hybrid laser.

Example 10 includes the apparatus of example 3, further including an electrical modulator input in the first substrate, the electrical modulator input electrically coupled, across the first interface, to the charge modulated region.

Example 11 includes the apparatus of example 3, further including an electrical modulator input in a third substrate, the electrical modulator input electrically coupled to the charge modulated region at a third surface of the second substrate, the third surface opposite the first interface.

Example 12 includes the apparatus of example 6, wherein the state includes a resonance frequency of the ring resonator.

Example 13 includes the apparatus of example 6, wherein the ring resonator is oriented perpendicular to a plane of the second substrate.

Example 14 includes the apparatus of example 6, wherein the ring resonator is oriented parallel to a plane of the second substrate.

Example 15 includes a method of assembling a vertically disaggregated photonic device, the method comprising fabricating a first substrate with an optical waveguide near a first surface of the first substrate, the waveguide is a first part of the vertically disaggregated photonic device, fabricating a second substrate with a photonic integrated circuit (PIC) at or near a second surface of the second substrate, the PIC is a second part of the vertically disaggregated photonic device, and hybridly bonding the first substrate to the second substrate with the optical waveguide and the PIC aligned and optically coupled to assemble the vertically disaggregated photonic device.

Example 16 includes the method of example 15, wherein the fabricating of the second substrate further includes fabricating a planar optical waveguide ring on a wafer, and positioning the planar optical waveguide ring in the second substrate in a perpendicular position relative to a horizontal plane of the second substrate, the horizontal plane parallel to the interface, wherein the planar optical waveguide ring is at least a portion of the PIC.

Example 17 includes the method of example 15, wherein the fabricating of the second substrate further includes fabricating a first optical waveguide layer in the second substrate, fabricating a second optical waveguide layer in the second substrate, coupling a first optical via to a first end of the first optical waveguide and to a first end of the second optical waveguide, and coupling a second optical via to a second end of the first optical waveguide and to a second end of the second optical waveguide such that the first and second optical waveguides and the first and second optical vias form an optical waveguide ring, wherein the optical waveguide ring is at least a portion of the PIC.

Example 18 includes the method of example 15, further including fabricating 90-degree turning components to couple the first and second optical vias to the first and second optical waveguides, respectively.

Example 19 includes an apparatus, comprising a semiconductor device package, the semiconductor device package including a first substrate, the first substrate having a first surface, a first optical waveguide at or near the first surface of the first substrate, a second substrate, the second substrate having a second surface and a third surface, the second substrate coupled to the first substrate at an interface, a photonic integrated circuit (PIC), at least a portion of the PIC at or near the second surface, the PIC in alignment with and optically coupled to the first optical waveguide across the interface, and a third substrate, the third substrate coupled to the second substrate at the third surface, the third surface opposite the first interface.

Example 20 includes the apparatus of example 19, wherein the second substrate is hybridly bonded to the first substrate at the interface.

Example 21 includes the apparatus of example 19, further including a charge modulated region in the second substrate, the charge modulated region to adjust a state of the PIC in response to a signal.

Example 22 includes the apparatus of example 21, wherein the second substrate includes an electro-optical material in the charge modulated region of the second substrate, the electro-optical material is responsive to the signal, and at least one electrically conductive input electrically coupled to the electro-optical material.

Example 23 includes the apparatus of example 22, further including an electrical modulator input in the third substrate, the electrical modulator input electrically coupled to the charge modulated region at a third surface of the second substrate, the third surface opposite the first interface.

Example 24 includes the apparatus of example 19, further including a ring resonator.

Example 25 includes the apparatus of example 24, wherein the ring resonator is a component of a ring resonator modulator.

Example 26 includes the apparatus of example 20, wherein the PIC includes a photodetector.

Example 27 includes the apparatus of example 20, wherein the PIC is a component of at least one hybrid laser.

Example 28 includes the apparatus of example 19, wherein the third substrate is a compute die.

Example 29 includes the apparatus of example 19, wherein the third substrate is an input/output controller.

Example 30 includes the apparatus of example 19, wherein the third substrate is solder bump bonded to the second substrate.

Example 31 includes the apparatus of example 19, wherein the third substrate is hybridly bonded to the second substrate.

What is claimed is:

1. An apparatus, comprising:
    a first semiconductor die, the first semiconductor die having a first surface;
    a first optical waveguide associated with the first semiconductor die, the first optical waveguide optically accessible at the first surface of the first semiconductor die;
    a second semiconductor die, the second semiconductor die having a second surface, the second semiconductor die different from the first semiconductor die, the second semiconductor die coupled to the first semiconductor die at an interface; and
    a photonic integrated circuit (PIC) associated with the second semiconductor die, at least a portion of the PIC optically accessible at the second surface, the PIC in alignment with and optically coupled to the first optical waveguide across the interface, the interface has a thickness of 1 micrometer or less.

2. The apparatus of claim 1, wherein the second semiconductor die is hybridly bonded to the first semiconductor die at the interface.

3. The apparatus of claim 2, wherein the first semiconductor die is optically passive.

4. The apparatus of claim 3, wherein the PIC includes a photodetector.

5. The apparatus of claim 3, wherein the PIC is a component of at least one hybrid laser.

6. The apparatus of claim 1, including a charge modulated region in the second semiconductor die, the charge modulated region to adjust a state of the PIC in response to a signal.

7. The apparatus of claim 6, wherein the second semiconductor die includes:
    an electro-optical material in the charge modulated region of the second semiconductor die, the electro-optical material is responsive to the signal; and
    at least one electrically conductive input electrically coupled to the electro-optical material.

8. The apparatus of claim 6, including a ring resonator.

9. The apparatus of claim 8, wherein the ring resonator is a component of a ring resonator modulator.

10. The apparatus of claim 8, wherein the state includes a resonance frequency of the ring resonator.

11. The apparatus of claim 8, wherein the ring resonator is oriented perpendicular to a plane of the second semiconductor die.

12. The apparatus of claim 8, wherein the ring resonator is oriented parallel to a plane of the second semiconductor die.

13. The apparatus of claim 6, including an electrical modulator input in the first semiconductor die, the electrical modulator input electrically coupled, across the interface, to the charge modulated region.

14. The apparatus of claim 6, including an electrical modulator input in a third semiconductor die, the electrical modulator input electrically coupled to the charge modulated region at a third surface of the second semiconductor die, the third surface opposite the interface.

15. A method of assembling a vertically disaggregated photonic device, the method comprising:
    fabricating a first substrate with an optical waveguide at a first surface of the first substrate, the optical waveguide is a first part of the vertically disaggregated photonic device;
    fabricating a second substrate with a photonic integrated circuit (PIC) at a second surface of the second substrate, the PIC is a second part of the vertically disaggregated photonic device; and
    hybridly bonding the first surface of the first substrate to the second surface of the second substrate at an interface, the interface having a sub-micron thickness, the first surface bonded to the second surface so that the optical waveguide and the PIC are aligned and optically coupled across the interface to assemble the vertically disaggregated photonic device.

16. The method of claim 15, wherein the fabricating of the second substrate includes:
    fabricating a planar optical waveguide ring on a wafer; and
    positioning the planar optical waveguide ring in the second substrate in a perpendicular position relative to a horizontal plane of the second substrate, the horizontal plane parallel to an interface of the first surface of the first substrate and the second surface of the second substrate, wherein the planar optical waveguide ring is at least a portion of the PIC.

17. The method of claim 15, wherein the fabricating of the second substrate includes:
    fabricating a first optical waveguide layer in the second substrate;
    fabricating a second optical waveguide layer in the second substrate;
    coupling a first optical via to a first end of the first optical waveguide layer and to a first end of the second optical waveguide layer; and
    coupling a second optical via to a second end of the first optical waveguide layer and to a second end of the second optical waveguide layer such that the first and second optical waveguide layers and the first and second optical vias form an optical waveguide ring, wherein the optical waveguide ring is at least a portion of the PIC.

18. The method of claim 17, including fabricating 90-degree turning components to couple the first and second optical vias to the first and second optical waveguide layers, respectively.

19. An apparatus, comprising:
a semiconductor device package, the semiconductor device package including:
a first substrate, the first substrate having a first surface;
a first optical waveguide associated with the first substrate, the first optical waveguide at the first surface of the first substrate;
a second substrate, the second substrate having a second surface and a third surface, the second substrate coupled to the first substrate at an interface;
a photonic integrated circuit (PIC) associated with the second substrate, at least a portion of the PIC at the second surface, the PIC in alignment with and optically coupled to the first optical waveguide across the interface, a thickness of the interface small enough to position the first optical waveguide within 1 micrometer from the PIC; and
a third substrate, the third substrate coupled to the second substrate at the third surface, the third surface opposite the interface.

20. The apparatus of claim 19, wherein the second substrate is hybridly bonded to the first substrate at the interface.

21. The apparatus of claim 20, wherein the PIC includes a photodetector.

22. The apparatus of claim 20, wherein the PIC is a component of at least one hybrid laser.

23. The apparatus of claim 19, including a charge modulated region in the second substrate, the charge modulated region to adjust a state of the PIC in response to a signal.

24. The apparatus of claim 23, wherein the second substrate includes:
an electro-optical material in the charge modulated region of the second substrate, the electro-optical material is responsive to the signal; and
at least one electrically conductive input electrically coupled to the electro-optical material.

25. The apparatus of claim 24, including an electrical modulator input in the third substrate, the electrical modulator input electrically coupled to the charge modulated region at a third surface of the second substrate.

26. The apparatus of claim 19, including a ring resonator.

27. The apparatus of claim 26, wherein the ring resonator is a component of a ring resonator modulator.

28. The apparatus of claim 19, wherein the third substrate is a compute die.

29. The apparatus of claim 19, wherein the third substrate is an input/output controller.

30. The apparatus of claim 19, wherein the third substrate is solder bump bonded to the second substrate.

31. The apparatus of claim 19, wherein the third substrate is hybridly bonded to the second substrate.

* * * * *